United States Patent [19]
Jones et al.

[11] Patent Number: 4,661,938
[45] Date of Patent: Apr. 28, 1987

[54] SONAR APPARATUS

[75] Inventors: Charles H. Jones, Pasadena; John W. Kesner, Severna Park, both of Md.

[73] Assignee: Westinghouse Electric Corp., Pittsburgh, Pa.

[21] Appl. No.: 821,717

[22] Filed: Jan. 23, 1986

[51] Int. Cl.⁴ .............................................. G01S 3/80
[52] U.S. Cl. ..................................... 367/123; 367/153
[58] Field of Search ............... 367/123, 129, 153, 155, 367/156

[56] References Cited
U.S. PATENT DOCUMENTS 3,803,543 4/1974 Cioccio et al. ....................... 367/123

Primary Examiner—Richard A. Farley
Attorney, Agent, or Firm—D. Schron

[57] ABSTRACT

A passive sonar system which forms multiple receiver beams for detection of possible targets. The transducer array for the system includes a plurality of pairs of transducers, the transducers of each pair lying along a generally radial line emanating from a central point. The output signal from the outer transducer of each pair is delayed by 90° or λ/4C relative to the inner transducer, and the delayed signal is combined with the output signal from the other transducer of the pair in a summing amplifier so that only one signal per transducer pair need be sampled by a multiplexer for transmission via a coaxial cable to beamformer apparatus. The concept is applicable to groups of transducers with more than just a pair, i.e., with three or more transducers. Appropriate additional delays are provided with all of the output signals and delayed output signals of a group being received by a single summing amplifier.

11 Claims, 13 Drawing Figures

4,661,938

SONAR APPARATUS

BACKGROUND OF THE INVENTION

1. Field of the Invention

The invention in general relates to the field of sonar and particularly to apparatus utilized for passive receiver beam formation.

2. Description of the Prior Art

Beamformer apparatus is utilized in conjunction with a transducer array to form one or more beams for detecting distant targets in the underwater environment.

In one type of system a circular or cylindrical array of transducer elements is utilized in the formation of a single beam which may be rotated around 360°. A more common arrangement, particularly with digital beamformer apparatus, simultaneously generates a plurality of receiver beams which point in different azimuth directions around a full 360°, or lesser angle.

Use of a circular array of multiple transducer elements results in a large unacceptable backlobe which must be eliminated in order to achieve acceptable directivity.

One way of eliminating this large backlobe is by the incorporation of baffles for the individual elements or groups of elements which, when their individual responses are combined, produce patterns with the desired front to back ratio. The use of baffles, however, significantly increases the weight and size of the transducer array since a minimum separation between transducer elements of approximately $\lambda/2$ is required, where $\lambda$ is the wavelength of the center frequency of interest of acoustic energy being detected. At low frequencies the value of $\lambda$ can be quite large, making the array unmanageable for certain deployment vehicles. To this end the array may be made collapsable and then expanded to full size only after deployment from the carrier vehicle. In addition, the baffle arrangement presents transducer mounting problems as well as machining problems for the baffle itself.

The present invention presents an arrangement which eliminates the need for baffles and allows a smaller collapsed diameter transducer array to be utilized without sacrificing directivity or detection capabilities when expanded after deployment.

SUMMARY OF THE INVENTION

The apparatus is comprised of a plurality of groups of active transducer elements each being operable to provide an output signal in response to impingement of acoustic energy emanating from a distant target. Each group includes two or more transducer elements positioned one behind the other along a generally radial line and spaced from one another by a distance of $\lambda/4$ where $\lambda$ is the wavelength of the center frequency of interest of the acoustic energy radiated by a possible target of interest.

Means are provided for phase shifting, by $-90°$, or time delaying by $\lambda/4C$, where C is the speed of sound in water, the output signal from one transducer element with respect to the output signal of a next adjacent transducer element which is farther away from the target. The output signals, as well as the phase shifted or time delayed output signals of the transducer elements of respective ones of the groups are summed and amplified with the resulting summed and amplified signals from all of the groups being provided to beamformer apparatus so that a plurality of receiver beams may be formed. The signals may be transmitted to the beamformer via a small coaxial cable by means of multiplexing equipment which sequentially samples and transmits the respective group signals.

BRIEF DESCRIPTION OF THE PREFERRED EMBODIMENTS

Figure 1:
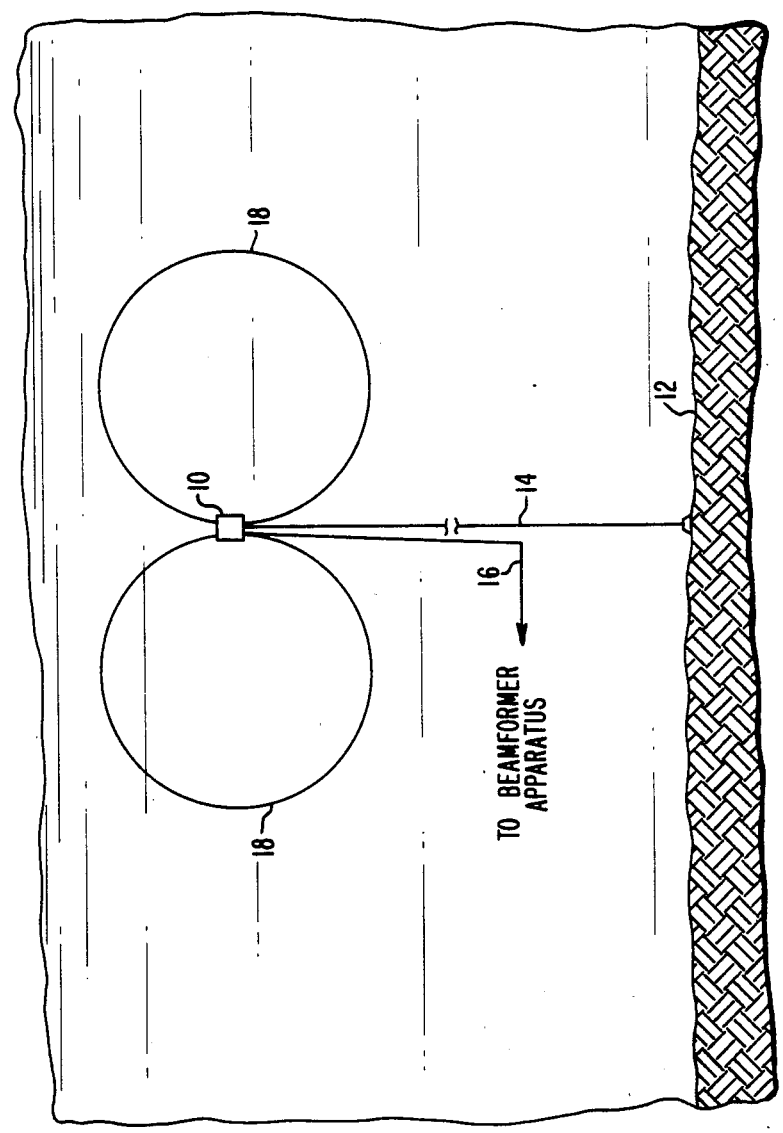
FIG. 1 illustrates a typical underwater passive detection system utilizing a ring of monopole hydrophones, and further illustrates typical vertical beam patterns.

In FIG. 1 a housing 10 containing a circular array of monopole transducer elements is affixed in position relative to the sea bottom 12 by means of a mooring system 14. The elements provide respective output signals in response to receipt of acoustic energy as may be radiated by a distant target, with the output signals being provided via cable 16 to beamformer apparatus at a distant location.

Figure 2:
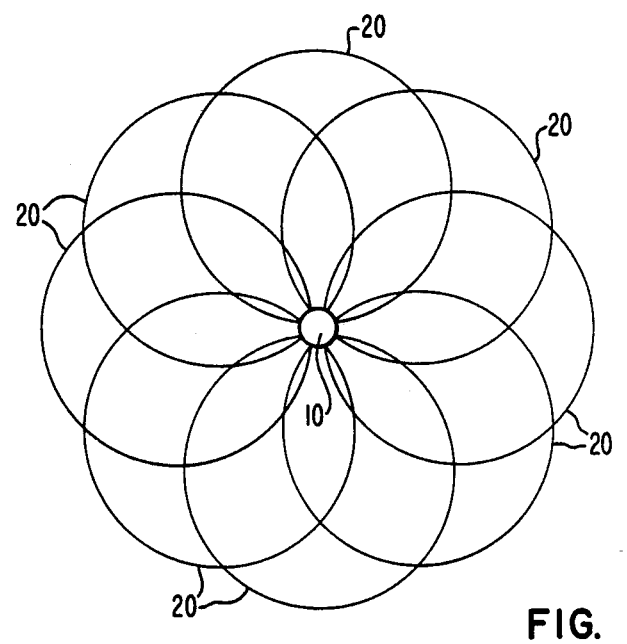
FIG. 2 is a plan view of the apparatus of FIG. 1 illustrating typical horizontal beam patterns.

The beamformer apparatus utilizes the outputs from different groups of transducer elements and a plurality of beams are formed for looking out at various azimuth directions around 360°, and a typical vertical beam pattern 18 is illustrated. For the monopole elements, horizontal beam patterns such as 20 in FIG. 2 are formed.

The typical beam patterns illustrated are the forward beam pattern shown in idealized form. Each beam pattern may have a corresponding backlobe which would interfere with proper operation of the apparatus. Accordingly, the housing 10 would include some sort of baffle arrangement for minimization of unwanted lobes, and thus significantly contributing to the overall weight and total cost of the detection system.

The present invention may be operable to form relatively sharp detection beams with apparatus which, by the elimination of a baffle system, may be made with a smaller undeployed collapsed diameter, less weight and lower cost.

Figure 3:
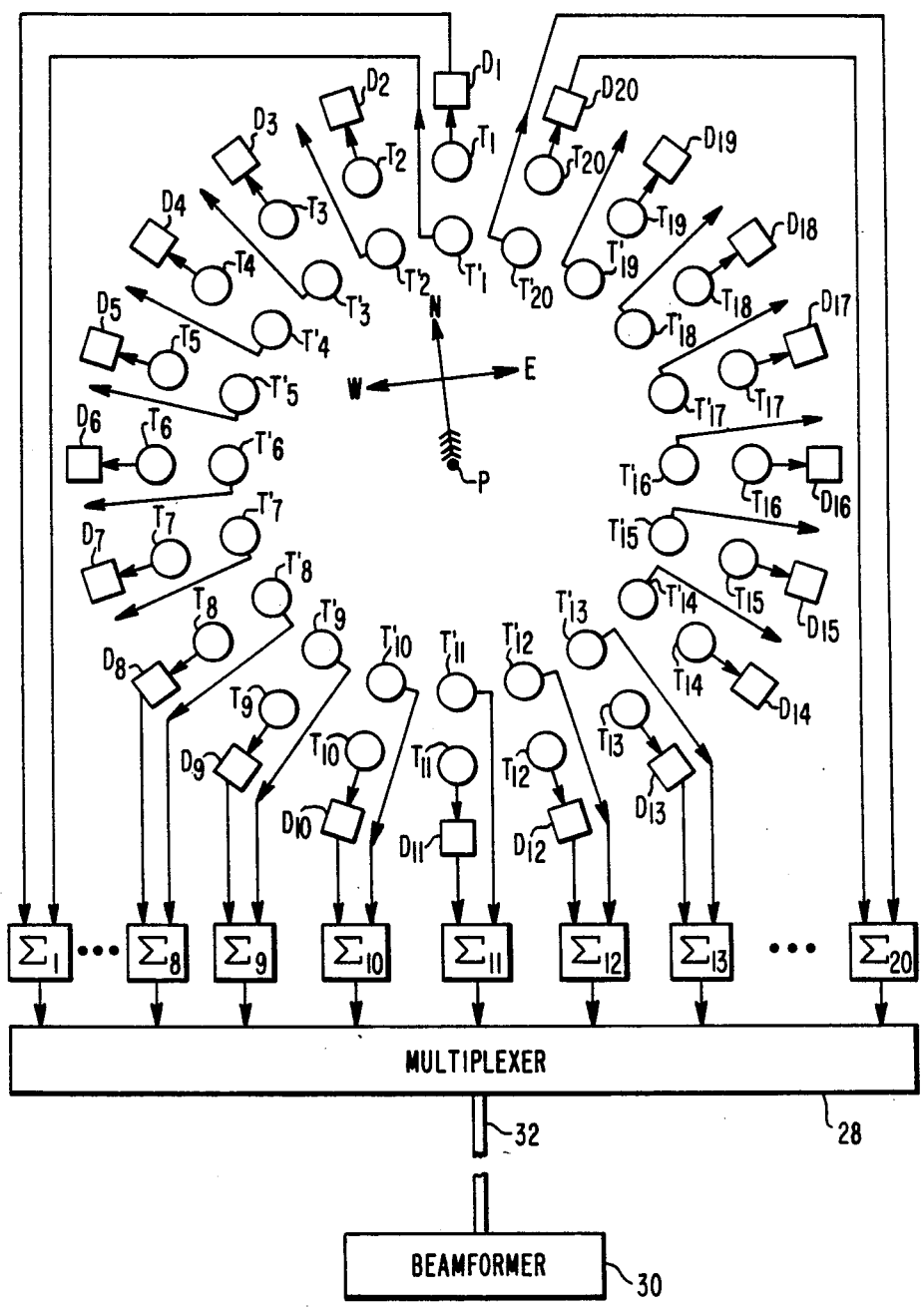
FIG. 3 is a block diagram illustrating one embodiment of the present invention.

The embodiment of the invention illustrated in FIG. 3 includes a plurality of groups of monopole transducers $T_1$, $T'_1$ to $T_{20}$, $T'_{20}$ with each group, in this case, two, lying generally along a respective radial line emanating from central point P. Twenty transducer groups are shown by way of example as being symmetrically disposed about 360° of azimuth so that 18° separates each group.

The view of the transducers of FIG. 3 is a plan view wherein all of the unprimed transducers $T_1$ to $T_{20}$ lie along one circle and constitute the outer transducers while the primed transducers $T'_1$ to $T'_{20}$ lie along a concentric circle of smaller diameter and constitute the inner transducers.

The radial separation between a primed and unprimed transducer of a group is $\lambda/4$, where $\lambda$ is the wavelength of the center frequency of interest which will be emanating from a possible distant target.

The output signals from the transducers of each group are provided to respective summing amplifiers $\Sigma_1$ to $\Sigma_{20}$, however, since the acoustic energy will impinge upon the inner transducer one-quarter of a period after it impinges upon its corresponding outer transducer, the signal from the outer transducer is delayed such as by means of a $\lambda/4C$ time delay or a 90° phase shifter respectively designated $D_1$ to $D_{20}$.

Figure 4:
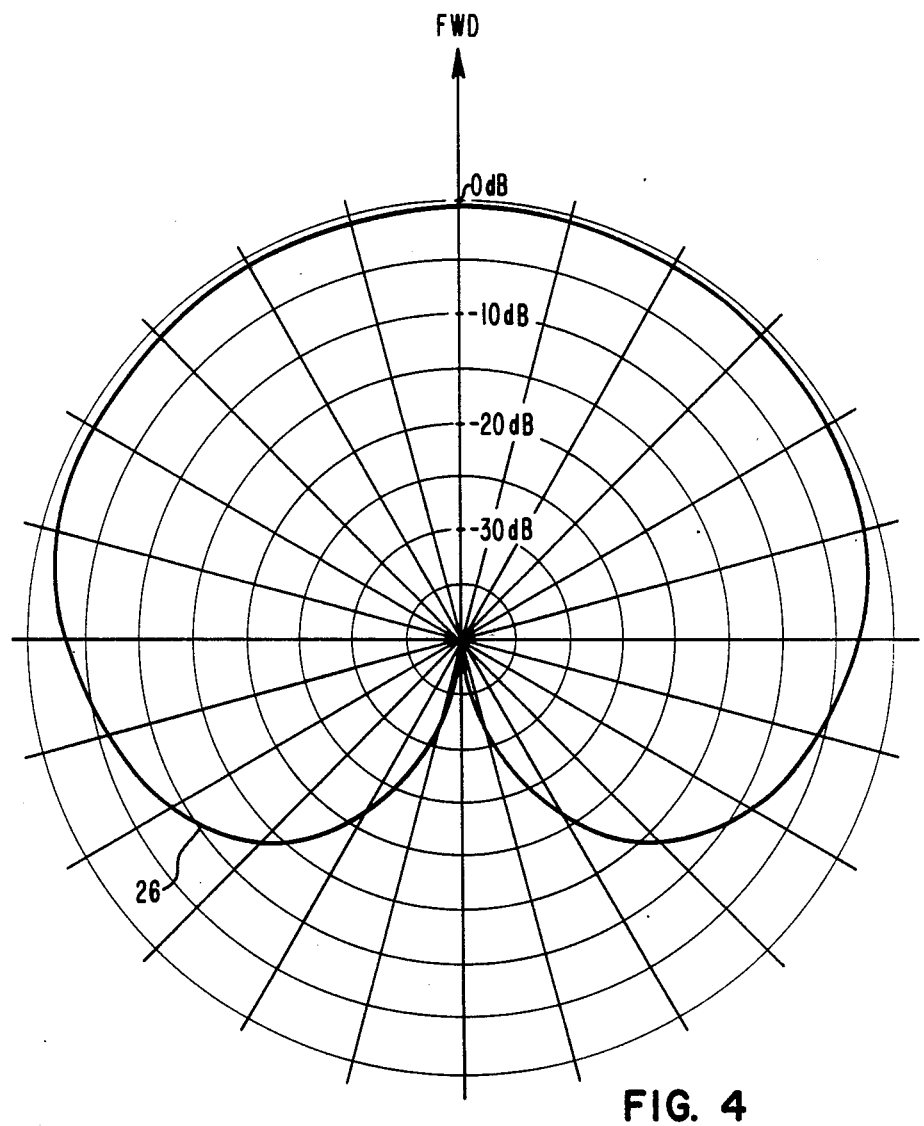
FIG. 4 illustrates a beam pattern resulting from one transducer pair of the arrangement of FIG. 3.

In actual operation only half the number of transducers are needed in forming each of a plurality of beams. For example, to form a beam in the north direction, transducers $T_1$ to $T_6$ and $T_{17}$ to $T_{20}$ would be used in combination with respective transducers $T'_1$ to $T'_6$ and $T'_{17}$ to $T'_{20}$. This would be the preferable arrangement although the delays could be applied to the inner transducers instead of the outer transducers in which case transducers $T'_7$ to $T'_{16}$ in combination with transducers $T_7$ to $T_{16}$ would be used for forming the beam in the north direction. As opposed to a conventional omnidirectional beam as would be provided by a single monopole transducer element, each transducer group would form a well-known cardioid beam pattern. A typical cardioid beam pattern is represented by numeral 26 in FIG. 4 and it is seen that the respose in the rear direction is significantly less than that in the forward direction. Although not illustrated, the cardioid pattern would distort somewhat for frequencies displaced from the center frequency of interest, however, satisfactory results will still obtain within a limited frequency band of interest.

Returning once again to FIG. 3, a multiplexer 28 is operable to sequentially sample the summing amplifier output signals for transmission to beamformer 30 by means of a coaxial cable 32. Although a totality of 40 transducers are illustrated, only half that number of signals need be multiplexed by virtue of the summation function of the summing amplifiers $\Sigma_1$ to $\Sigma_{20}$. Not only is the total number of cables reduced but the arrangement reduces the total bandwidth required and the beamformer apparatus can be simplified because of the reduced number of input signals provided to it.

Figure 5:
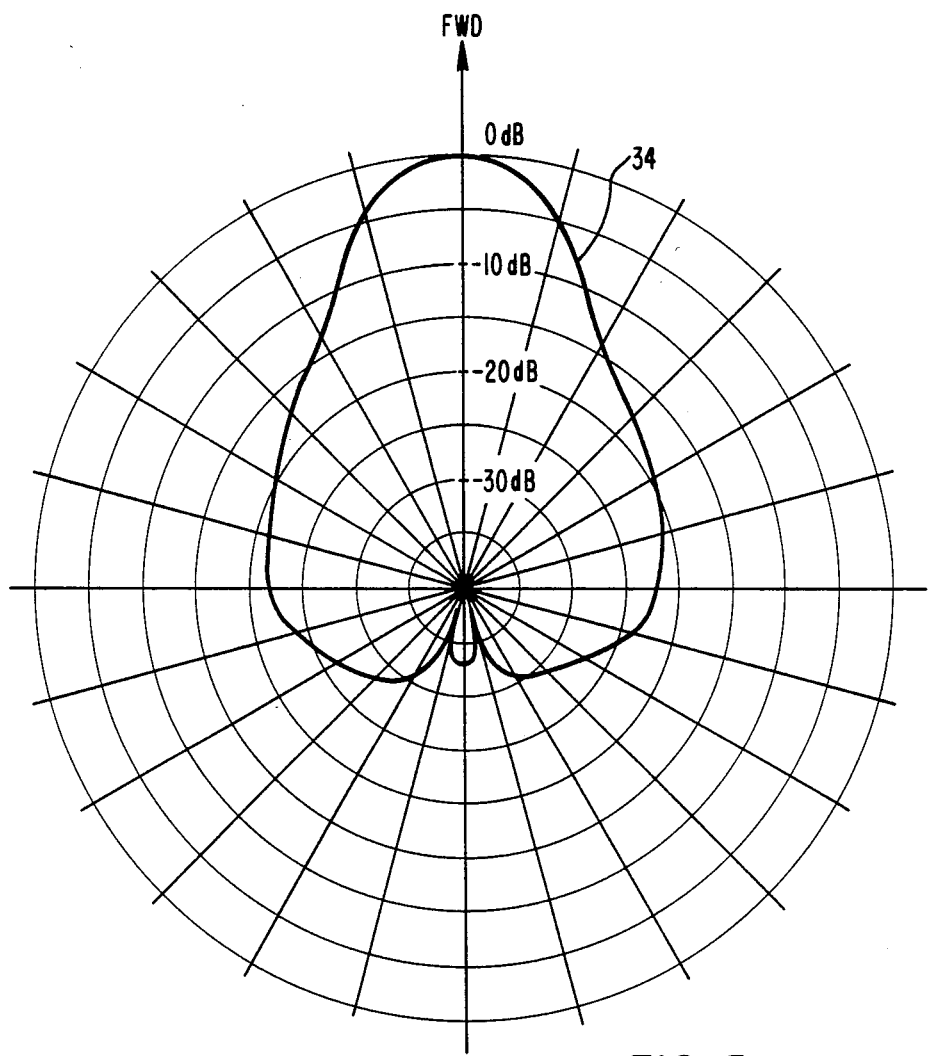
FIG. 5 is a beam pattern of a receiver beam formed with the array of FIG. 3.

Conventional amplitude shading may be applied to each summed signal to result in a narrower beam such as represented by numeral 34 in FIG. 5. Beam pattern 34 is the result of applying shading factors of 2, 14, 42, 76, 100, 100, 76, 42, 14, and 2 to ten consecutive pairs of the transducers illustrated in FIG. 3.

Figure 6:
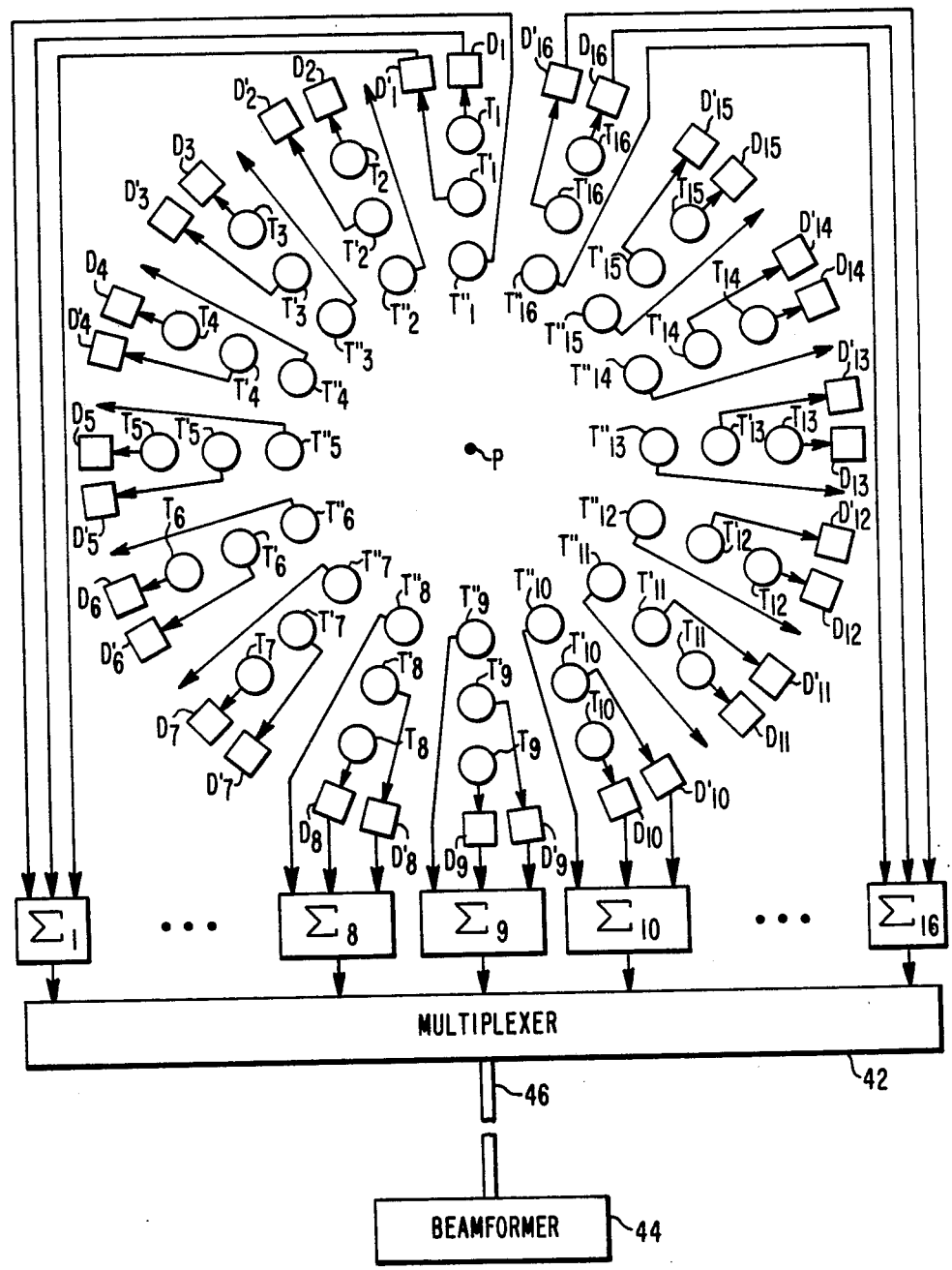
FIG. 6 illustrates another embodiment of the present invention.

FIG. 6 illustrates an arrangement similar to that of FIG. 3, however, each group in FIG. 6 includes three transducers $T_1$, $T'_1$, $T''_1$ to $T_{16}$, $T'_{16}$, $T''_{16}$, sixteen groups being shown by way of example. The transducers lie on three concentric rings separated by a distance of $\lambda/4$ such that delays $D'_1$ to $D'_{16}$ provide 90° phase shifts whereas delays $D_1$ to $D_{16}$ provide double the delay, or 180° of phase shift. In this manner all three output signals are simultaneously provided to respective summing amplifiers $\Sigma_1$ to $\Sigma_{16}$, the output signals of which are sequentially sampled by multiplexer 42 for transmission to distant beamformer 44 via coaxial cable 46.

Figure 7:
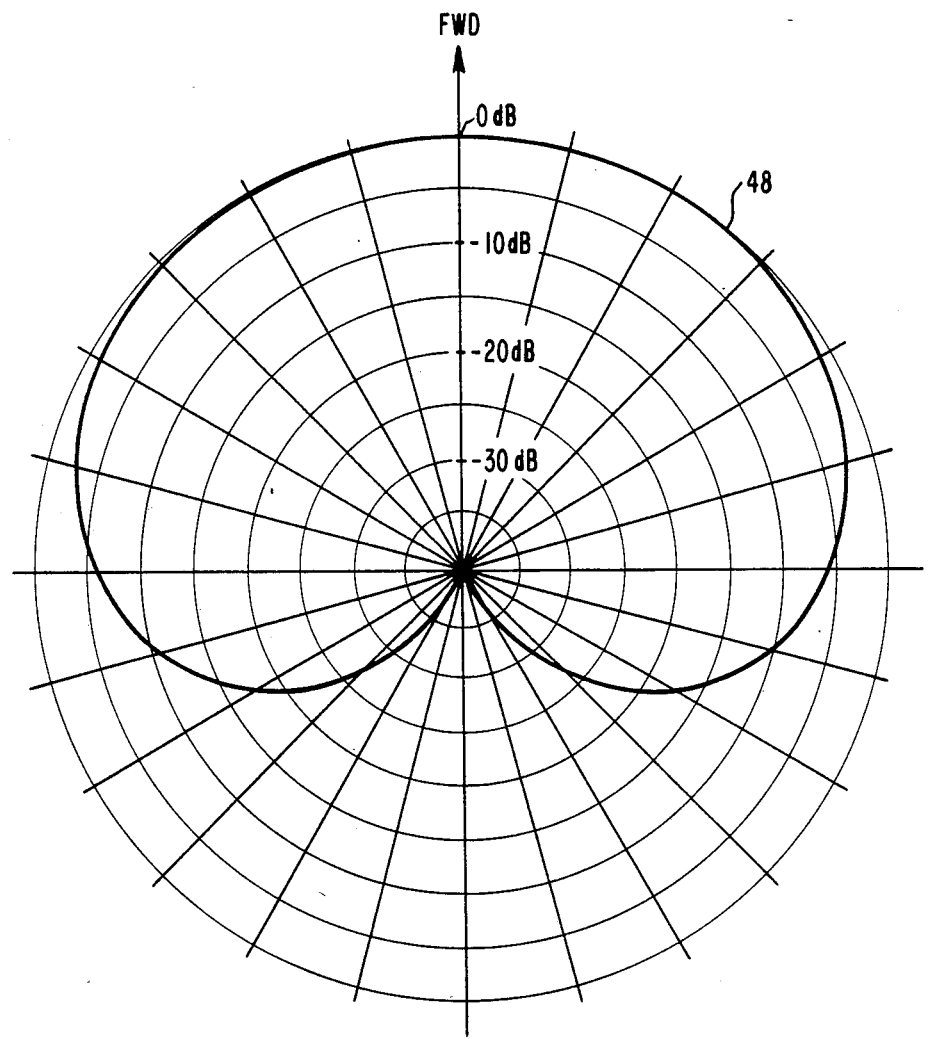
FIG. 7 is a beam pattern resulting from one trio of transducers of FIG. 6.

The cardioid type beam pattern resulting from each group of three transducers with their associated delays is illustrated by numeral 48 in FIG. 7. Beam pattern 48 exhibits an even greater attenuation in the rear direction than its counterpart cardioid beam pattern 26 of FIG. 4 generated with two transducers and a single delay.

Figure 8:
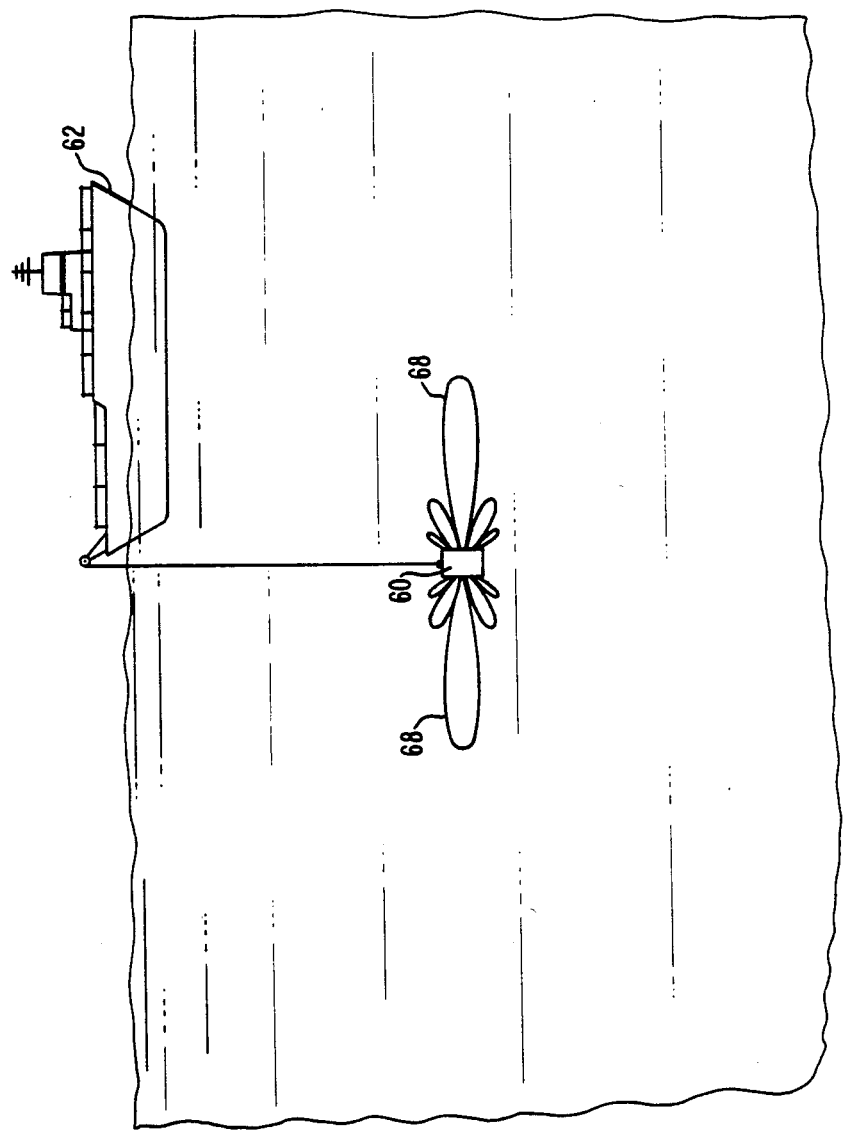
FIGS. 8 and 9 illustrate two typical deployment methods for the present invention.
Figure 9:
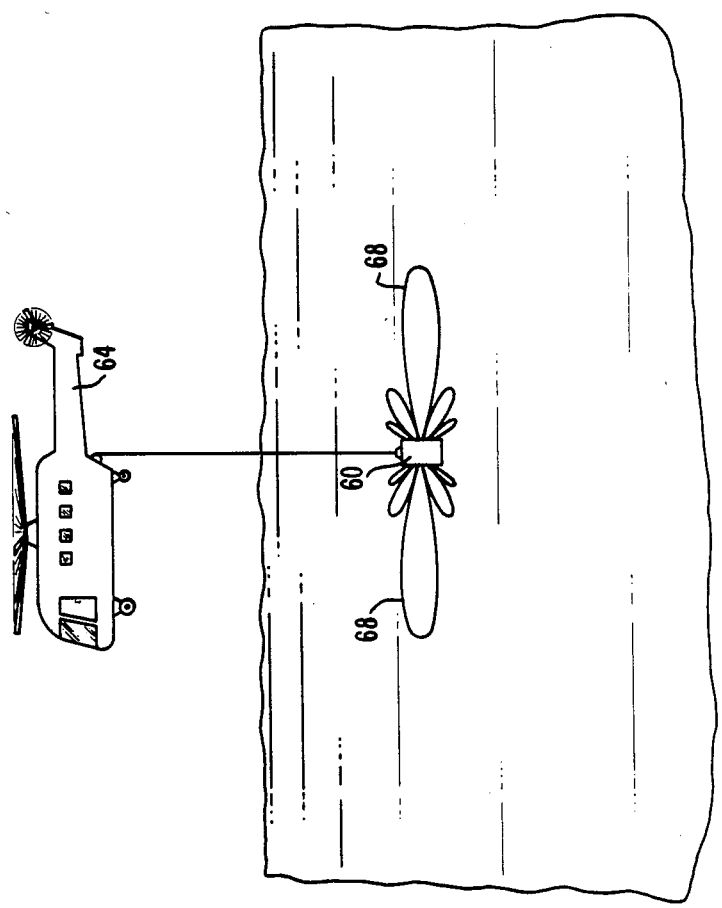

The reduction in weight and undeployed size afforded the transducer array by the present invention allows for eash handling and deployment of the apparatus. For example, FIG. 8 illustrates the deployment of the apparatus 60 from a surface vessel 62 while FIG. 9 illustrates its deployment from a space limited hovering helicopter 64. For some applications, particularly for those relatively close to the surface, a wide vertical beam pattern such as illustrated in FIG. 1 would be undesirable. In order to discriminate against noise which may be generated at the water surface, the vertical receiving beam pattern may be made relatively narrow as indicated by beam pattern 68 in FIGS. 8 and 9.

This reduction in vertical beamwidth is a wellknown technique accomplished with the utilization of elongated staves in the vertical direction, as opposed to single small elements. The stave concept is applicable in the present invention wherein for 360° detection capability, a plurality of elongated vertical staves would be positioned on two concentric cylinders, spaced by a distance of $\lambda/4$, with a 90° phase shift or time delay applied to the output signals of the outermost staves. An embodiment is illustrated in FIG. 10 wherein for clarity, only half cylinders, and only four groups of transducers are illustrated.

Each group of transducer staves, $T_1$, $T'_1$ to $T_4$, $T'_4$ lie generally in respective planes which extend radially from the central axis of the coaxial cylinders. After delay by respective 90° phase shifters or time delays $D_1$ to $D_4$, the transducer output signals are presented to summing amplifiers $\Sigma_1$ to $\Sigma_4$, the outputs of which are sequentially scanned by multiplexer 80 for transmission to beamformer 82. In the arrangements of FIGS. 8 and 9, coaxial cable 84 would be incorporated into an electromechanical type of cable.

Figure 10:
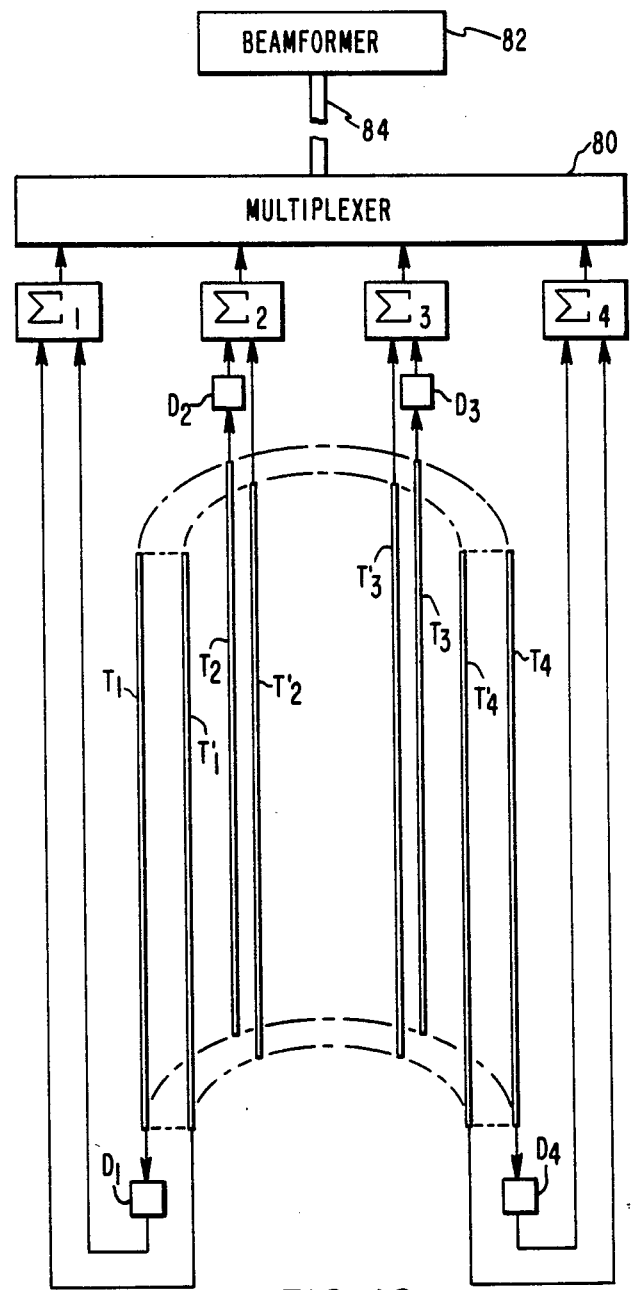
FIG. 10 illustrates another embodiment of the present invention for obtaining narrow vertical beams as illustrated in FIGS. 8 and 9.

The transducer elements or staves illustrated in FIG. 10 are shown as a continuous elongated transducer. The construction of each stave may take various forms, one of which is a single elongated piece of transducer active element material. A long piece of such material, however, may be somewhat fragile and accordingly may be made up of a plurality of adjacent smaller pieces. The same results can be achieved by utilizing a plurality of vertically oriented smaller transducer elements as in FIG. 3 or 6 with the vertical spacing between elements being in the order of $\lambda/2$.

Figure 11A:
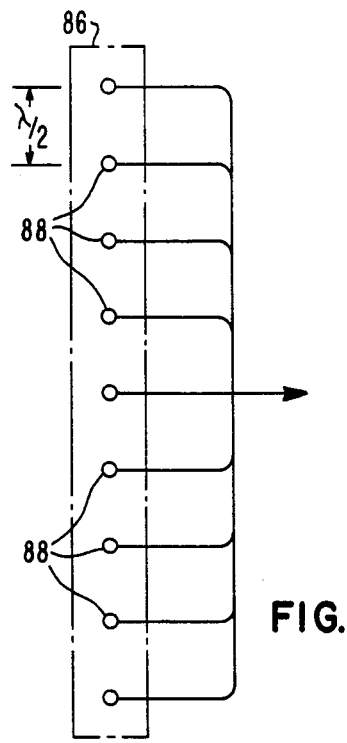
FIGS. 11A and 11B illustrate alternate forms of stave electrodes as illustrated in FIG. 10 and further illustrate typical electrical connections to the elements.
Figure 11B:
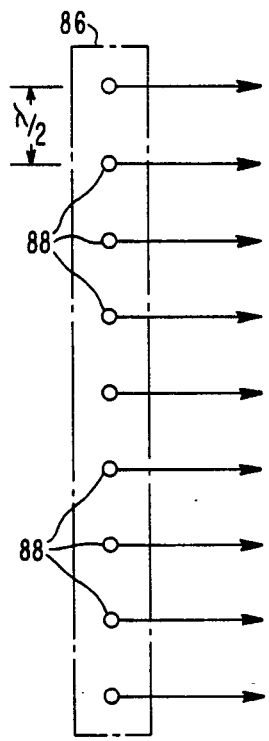

By way of example FIGS. 11A and 11B illustrate a transducer stave 86 made up of a plurality of smaller elements 88. In the arrangement of FIG. 11A, the output signals from all of the vertically aligned elements are combined to provide a single stave output signal which is either fed directly to a summary amplifier or to a $-90°$ phase shifter, or time delay, depending upon the stave's location in its respective group. With such arrangement, the vertical beam pattern would have a fixed depression (or elevation) angle of zero degrees with respect to horizontal. In the arrangement of FIG.

11B, the output signals of all the vertically arranged elements 88 are treated separately so that different phase shifts may be applied prior to signal processing to allow for a varying of the depression (or elevation) angle as a function of the phase shifts.

Figure 12:
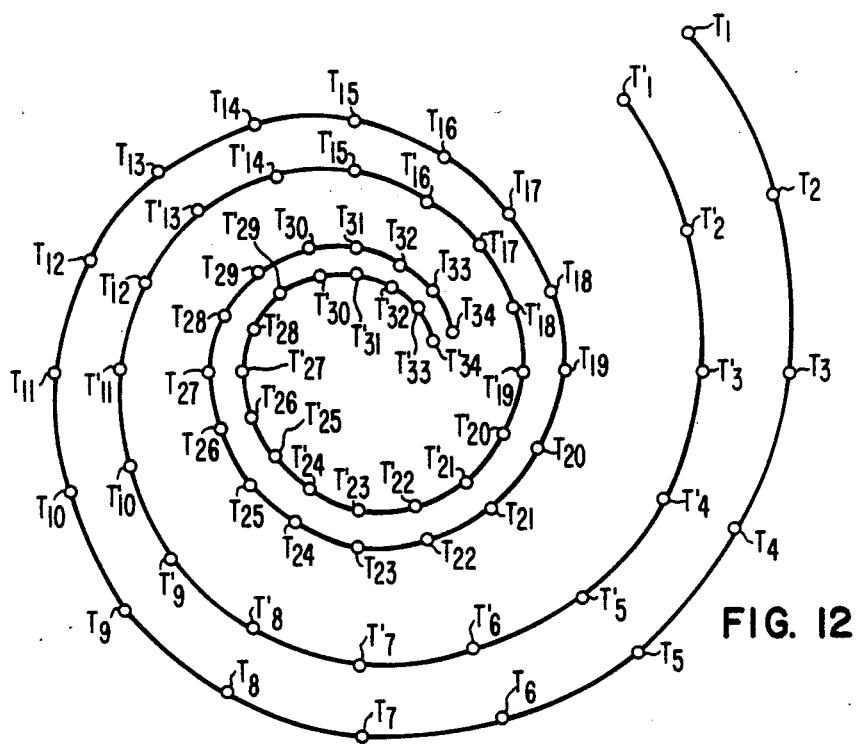
FIG. 12 illustrates yet another embodiment of the present invention.

FIG. 12 illustrates a plan view of the positioning of transducer groups in accordance with another embodiment of the present invention. Two transducers per group and 34 groups are illustrated, with the unprimed transducers lying generally along an outer spiral line while the primed transducers lie along an inner spiral line.

In the spiral embodiment of FIG. 12, the transducer groups lie along generally radial lined emanating from point P and the distance separating transducers of each group varies from a maximum separation with transducer pair $T_1$, $T'_1$ to a minimum separation with transducer pair $T_{34}$, $T'_{34}$. The transducers would be electrically connected as in FIG. 3, with each transducer on the outer spiral being appropriately delayed by 90° such that the transducers are spaced to examine slightly different center frequencies of interest since the quarter wavelength separation between transducer pairs varies.

The apparatus thus described completely eliminates the need for a baffle arrangement with its shortcomings in that the transducer elements including the staves may be simply positioned in a correct orientation and thereafter potted such as by polyurethane, so as to maintain their relative orientation. Where the apparatus may be constrained to a relatively small maximum diameter prior to deployment, such as in the helicopter case of FIG. 9, the transducer groups may be carried by collapsible arms which expand to the proper diameter after deployment, such collapsible-expandable fixtures being well known to those skilled in the art.

Although the various embodiments have been discussed with respect to examining a target area of interest around a full 360°, it is to be understood that the apparatus may be designed for examining less than a full circle in which case the transducers would lie generally along curved arcuate lines or surfaces less than 360°. Further, although only two or three elements per group are illustrated, it is to be understood that a greater number of elements may be provided in order to achieve higher resolution.

We claim:

1. Sonar apparatus comprising:
   (A) beamformer apparatus;
   (B) a plurality of groups of transducer elements, each said transducer element being operable to provide an output signal in response to impingement of acoustic energy emanating from a distant target;
   (C) each said group including at least two said transducer elements positioned one behind the other along a generally radial line and spaced from one another by a distance of $\lambda/4$, where $\lambda$ is the wavelength of the center frequency of interest of said acoustic energy;
   (D) means for delaying the output signal from one said transducer element with respect to the output signal provided by the next adjacent transducer element in said group;
   (E) means for summing and amplifying the (a) output signals and (b) delayed signals of said transducer elements of respective ones of said groups; and
   (F) means for providing said summed and amplified signals to said beamformer apparatus.

2. Apparatus according to claim 1 wherein:
   (A) said means for delaying is a 90° phase shifter.

3. Apparatus according to claim 1 wherein:
   (A) said means for delaying is a $\lambda/4C$ time delay, where C is the speed of sound in water.

4. Apparatus according to claim 1 which includes:
   (A) means for sequentially sampling the output signals for said summing and amplifying means and sequentially transmitting the sampled signals to said beamformer apparatus.

5. Apparatus according to claim 1 wherein:
   (A) each transducer element of each said group lies along a respective curved line.

6. Apparatus according to claim 5 wherein:
   (A) the transducer elements lying along a curved line are equally spaced from one another around 360°.

7. Apparatus according to claim 1 wherein:
   (A) said transducer elements are vertical elongated staves.

8. Apparatus according to claim 7 wherein:
   (A) each said stave is made up of a plurality of small transducer elements spaced approximately $\lambda/2$ from one another along a vertical line.

9. Apparatus according to claim 7 wherein:
   (A) said staves lie along respective concentric cylinders spaced $\lambda/4$ from one another.

10. Apparatus according to claim 5 wherein:
    (A) said curved lines are spirals.

11. Apparatus according to claim 10 which includes:
    (A) at least two spirals, the distance between which progressively changes.

* * * * *